Patented Nov. 10, 1925.

1,560,838

UNITED STATES PATENT OFFICE.

DANIEL H. MELOCHE, OF DETROIT, MICHIGAN, ASSIGNOR TO EARL HOLLEY, OF DETROIT, MICHIGAN.

COATING FOR METAL MOLDS.

No Drawing.     Application filed January 10, 1925.   Serial No. 1,581.

*To all whom it may concern:*

Be it known that I, DANIEL H. MELOCHE, a citizen of the United States, residing at 2490 Hazelwood Ave., Detroit, in the county of Wayne and State of Michigan, have invented certain new and useful Improvements in Coatings for Metal Molds, of which the following is a specification.

This invention relates to an improved coating for the protection of the surface of metal molds exposed to the molten metal. This invention relates specifically to the protection of cast iron molds when used for the production of iron castings in which a refractory coating is used next to the metal of the molds and in which a superimposed coating of lampblack is also used.

This application is an improvement on the invention disclosed in my Patent #1,453,593, filed August 11, 1922, issued May 1, 1923.

I have discovered that among the various grades of sodium silicate that are available as a binder there is one, known commercially as grade "C", which has superior binding qualities which enables the refractory coating to withstand the action of the molten iron for a larger number of castings than do the other grades.

Grade "C" contains 16.88%, by weight, of sodium oxide, 35.80% of silica, and 46.88% of water, and can therefore be represented by the formula $(Na_2O)_5(SiO_2)_{11}(H_2O)_{46}$. This grade is relatively heavy, 10 fluid ounces weighing approximaely one pound.

This sodium silicate is used as follows:—

Five parts by weight are dissolved in seventy parts by weight of water, and into this dilute solution twenty-five parts by weight of powdered fire clay are stirred. A thin wash is thus formed which is applied in thin layers onto a heated mold, as described in my Patent #1,506,130, filed March 14, 1923, issued August 26, 1924, so as to build up a coating of a substantial thickness (.02" to .04").

Any high grade fire clay may be used, or for that matter any high grade refractory in the powdered form. However, the fire clay which I use has a composition as follows:—

|  | Per cent. |
|---|---|
| Loss on ignition ($H_2O$) | 12.85 |
| $SiO_2$ | 46.50 |
| $Al_2O_3$ | 35.90 |
| $Fe_2O_3$ | 1.25 |
| MgO | .45 |
| $Na_2O$ | .04 |
| $K_2O$ | 2.47 |
| $SO_3$ | .06 |

12% moisture.

What I claim is:—

1. A wash for giving a protective coating to metal molds, comprising water containing a small quantity of "C" grade sodium silicate in solution and a relatively large quantity of a refractory powder in suspension.

2. A wash for giving a protective coating to metal molds, comprising substantially seventy parts of water by weight in which is dissolved five parts by weight of grade "C" sodium silicate, and in which is suspended twenty-five parts by weight of a refractory powder.

3. A wash for giving a protective coating to metal molds, comprising substantially seventy parts of water by weight in which is dissolved five parts by weight of grade "C" sodium silicate, and in which is suspended twenty-five parts by weight of powdered fire clay.

In testimony whereof I affix my signature.

DANIEL H. MELOCHE.